US012269551B2

(12) United States Patent
Ishii (10) Patent No.: US 12,269,551 B2
(45) Date of Patent: Apr. 8, 2025

(54) FRONT FENDER

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 254 days.

(21) Appl. No.: 17/903,717

(22) Filed: Sep. 6, 2022

(65) Prior Publication Data

US 2023/0074784 A1  Mar. 9, 2023

(30) Foreign Application Priority Data

Sep. 9, 2021 (JP) .................................. 2021-146872

(51) Int. Cl.
*B62J 15/02* (2006.01)
(52) U.S. Cl.
CPC ...................... *B62J 15/02* (2013.01)
(58) Field of Classification Search
CPC ........................................................ B62J 15/02
See application file for complete search history.

(56) References Cited

U.S. PATENT DOCUMENTS

| 5,026,083 | A  | * | 6/1991  | Wendorf ............... B62K 25/16 |
| | | | | 280/157 |
| 6,217,048 | B1 | * | 4/2001  | Saiki ........................ B62J 15/02 |
| | | | | 280/852 |
| 6,871,907 | B2 | * | 3/2005  | Morita ...................... B62J 1/00 |
| | | | | 297/214 |
| 8,033,366 | B2 | * | 10/2011 | Paulik ................... F16D 65/847 |
| | | | | 188/264 A |
| 8,439,380 | B2 | * | 5/2013  | Mori ...................... B62K 21/08 |
| | | | | 280/271 |
| 8,899,368 | B2 | * | 12/2014 | Ishii ...................... B62K 25/16 |
| | | | | 280/283 |
| 9,199,687 | B2 | * | 12/2015 | Takatsuka ............... G01P 3/488 |
| 9,878,756 | B2 | * | 1/2018  | Wakita .................... B62J 15/00 |
| 11,548,584 | B2 | * | 1/2023 | Yamada ................. B62K 11/04 |
| 11,780,524 | B2 | * | 10/2023 | Suzuki ..................... B62J 15/00 |
| | | | | 280/160.1 |
| 2006/0000652 | A1 | * | 1/2006 | Yamaguchi ............. B62J 15/00 |
| | | | | 296/78.1 |
| 2009/0051140 | A1 | * | 2/2009 | Saguchi ................... B62J 23/00 |
| | | | | 280/279 |
| 2016/0137247 | A1 | * | 5/2016 | Sasaki ...................... B62K 5/10 |
| | | | | 280/124.103 |
| 2023/0070742 | A1 | * | 3/2023 | Ishii ........................ B62K 25/08 |

(Continued)

FOREIGN PATENT DOCUMENTS

JP      2015-85743 A     5/2015

*Primary Examiner* — Erez Gurari
(74) *Attorney, Agent, or Firm* — Stein IP, LLC (57) ABSTRACT

A front fender attached to a front fork of a straddle-type vehicle, the front fender includes a fender body covering an upper side of a front wheel supported by the front fork, and a pair of fender side surfaces extending from two side edges of the fender body to an axle. The front fork is provided with brake caliper that brakes the front wheel. A lower edge of each of the fender side surfaces extends in a front-rear direction above the brake caliper, and includes a folded portion formed such that the lower edge of each of the fender side surfaces is directed inward in an axle direction.

10 Claims, 8 Drawing Sheets

(56) References Cited

U.S. PATENT DOCUMENTS

| | | | |
|---|---|---|---|
| 2023/0074784 A1* | 3/2023 | Ishii | B62J 15/02 |
| 2023/0078780 A1* | 3/2023 | Mayuzumi | B62K 11/04 |
| | | | 180/219 |
| 2024/0001902 A1* | 1/2024 | Uchiyama | B62K 19/32 |
| 2024/0132029 A1* | 4/2024 | Nose | B60T 7/22 |

* cited by examiner

FRONT FENDER

CROSS-REFERENCE TO RELATED APPLICATIONS

This application is based on Japanese Patent Application No. 2021-146872 filed on Sep. 9, 2021, the contents of which are incorporated herein by way of reference.

TECHNICAL FIELD

The present invention relates to a front fender.

BACKGROUND ART

A front fender is attached to a straddle-type vehicle such as a motorcycle. An example of such a front fender includes a front fender that effectively prevents muddy water from scattering with a fender body covering a front wheel from above (for example, see Patent Literature 1). In the front fender described in Patent Literature 1, a pair of leg portions extending from two front side edges of the fender body are attached to axle brackets, and a pair of support portions extending from two edges of a rear side of the fender body are attached to the axle brackets. The muddy water splashed up by the front wheel hits an inner surface of the fender body, thereby being prevented from scattering to the lighting equipment and the rider.

Patent Literature 1: JP-A-2015-085743

SUMMARY OF INVENTION

An aspect of the present invention provides a front fender attached to a front fork of a straddle-type vehicle. The front fender includes: a fender body covering an upper side of a front wheel supported by the front fork; and a pair of fender side surfaces extending from two side edges of the fender body to an axle. The front fork is provided with brake caliper that brakes the front wheel. A lower edge of each of the fender side surfaces extends in a front-rear direction above the brake caliper, and includes a folded portion formed such that the lower edge of each of the fender side surfaces is directed inward in an axle direction.

DESCRIPTION OF EMBODIMENTS

In the front fender described in Patent Literature 1, the muddy water hitting the inner surface of the fender body may flow down to brake calipers below the pair of support portions along inner surfaces of the pair of support portions, causing abnormal wear of brake pads. Although it is also conceivable to use wear-resistant brake pads, the cost may increase. In addition, when the muddy water adheres to outer surfaces of the brake calipers, dirt of the brake calipers is conspicuous and the appearance deteriorates. The same problem may occur not only for the muddy water but also for rain water.

The present invention is made in view of the above problem, and an object of the present invention is to provide a front fender that can prevent muddy water and rain water from scattering and falling onto brake calipers.

According to the front fender of the aspect of the present invention, muddy water and rain water splashed up by the front wheel hit an inner surface of the front fender, thereby being prevented from scattering. Although the muddy water and the rain water hitting the front fender move downward along inner surfaces of fender side surfaces, the folded portions prevent the muddy water and the rain water from flowing down from lower edges of the fender side surfaces to the brake calipers. Therefore, brake pads of the brake calipers can be prevented from abnormal wear, and the appearance of the brake calipers can be prevented from deteriorating due to dirt.

A front fender according to an aspect of the present invention is attached to a front fork of a straddle-type vehicle. A fender body of the front fender covers a front wheel supported by the front fork from above. A pair of fender side surfaces extend from two side edges of the fender body toward an axle. The front fork is provided with brake caliper that brakes the front wheel. A lower edge of each of the fender side surfaces extends in a front-rear direction above the brake caliper, and includes a folded portion formed such that the lower edge of each of the fender side surfaces is directed inward in an axle direction. Accordingly, muddy water and rain water splashed up by the front wheel hit an inner surface of the front fender, thereby being prevented from scattering. Although the muddy water and the rain water hitting the front fender move downward along inner surfaces of fender support portions, the folded portions prevent the muddy water and the rain water from flowing down from lower edges of the fender support portions to the brake calipers. Therefore, brake pads of the brake calipers can be prevented from abnormal wear, and the appearance of the brake calipers can be prevented from deteriorating due to dirt.

EMBODIMENT

Figure 1:
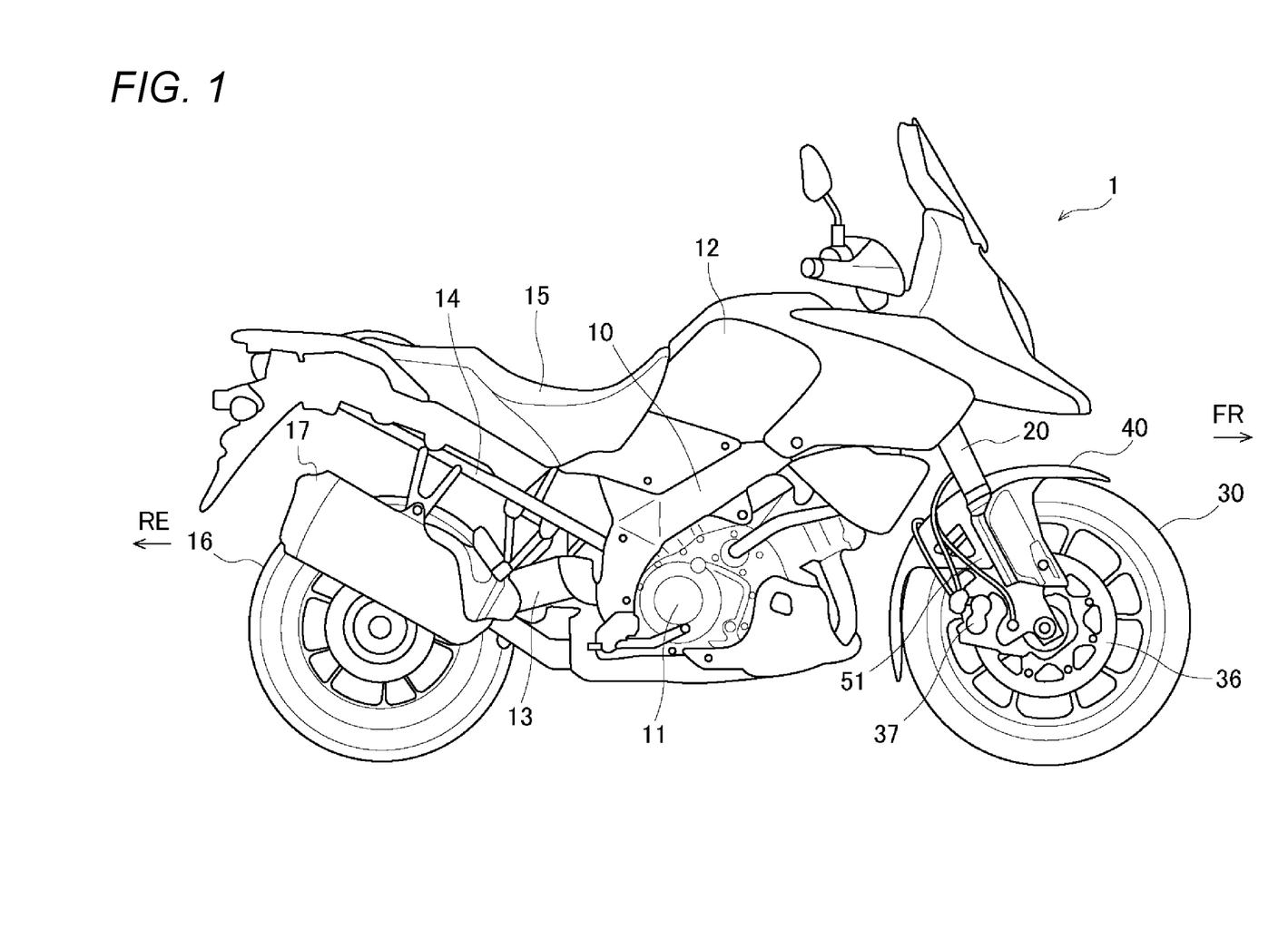
FIG. 1 is a right view of a straddle-type vehicle according to an embodiment.

Hereinafter, an embodiment will be described in detail with reference to the accompanying drawings. FIG. 1 is a right view of a straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 uses a twin spar type vehicle body frame formed of an aluminum alloy. The vehicle body frame includes a pair of main frames 10 branching from a head pipe (not shown) to left and right and extending rearward while embracing an engine 11. A fuel tank 12 is supported from below on front sides of the pair of main frames 10. A swing arm 13 is swingably supported on rear sides of the pair of main frames 10. A pair of seat rails 14 extend rearward from the pair of main frames 10. A seat 15 is supported by the pair of seat rails 14 from below.

A front fork 20 is steerably supported on the head pipe by a steering shaft (not shown). A front wheel 30 is rotatably supported on a lower portion of the front fork 20. The swing arm 13 extends rearward from lower portions of the main frames 10. A rear wheel 16 is rotatably supported on a rear end of the swing arm 13. The engine 11 is coupled to the rear wheel 16 via a chain drive type transmission mechanism. Power from the engine 11 is transmitted to the rear wheel 16 via the transmission mechanism. A muffler 17 is disposed a rear side relative to the engine 11. Exhaust gas from the engine 11 is discharged to the outside through the muffler 17.

A front fender 40 that prevents mud splash by the front wheel 30 is attached to the front fork 20. Although muddy water is prevented from scattering by the front fender 40, the muddy water flows down along an inner surface of the front fender 40 and adheres to brake calipers 37. At this time, brake pads may abnormally wear out and the appearance may deteriorate. Therefore, in the front fender 40 according to the present embodiment, a lower edge of each of fender support portions (fender side surfaces) 51 disposed above the brake calipers 37 is bent inward in the axle direction to prevent the muddy water from flowing down from the lower edge of the fender support portion 51 to the brake caliper 37.

Figure 2:
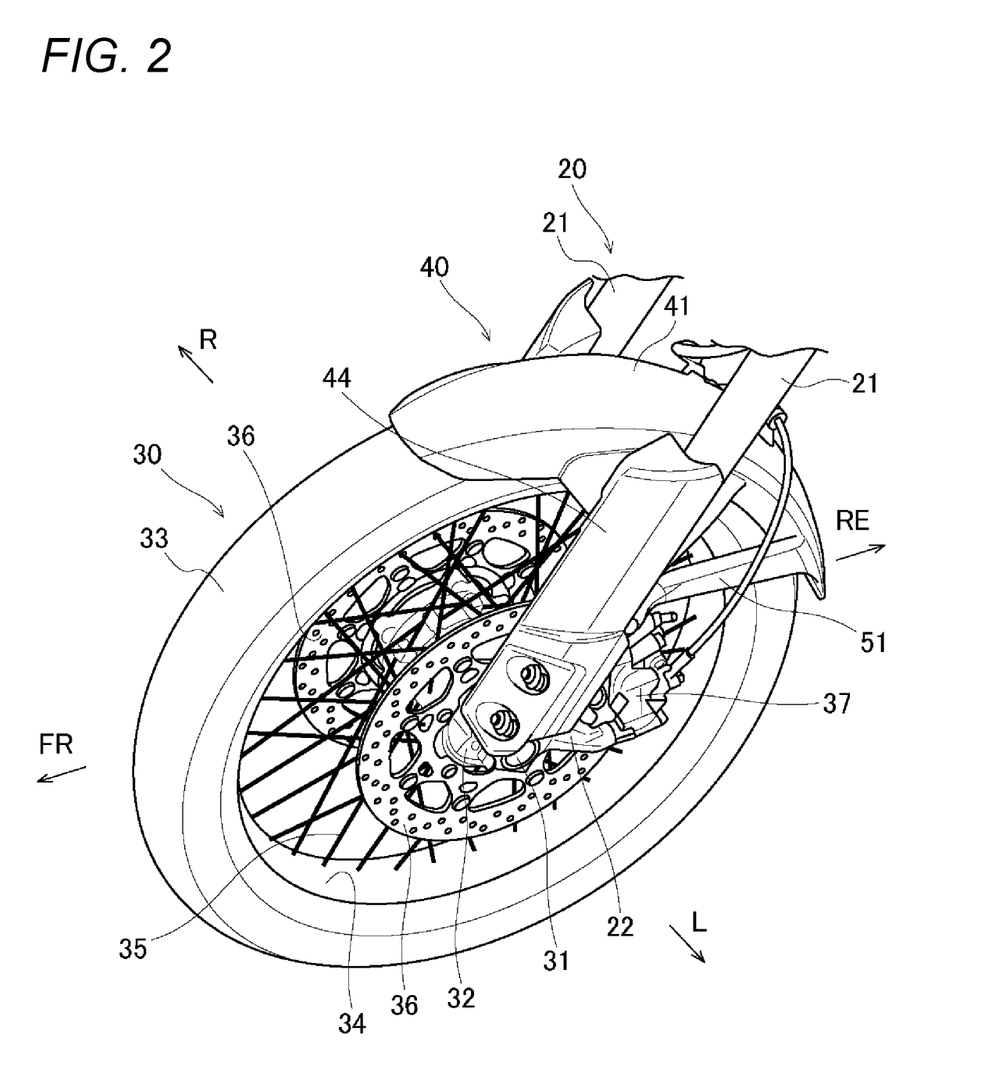
FIG. 2 is a perspective view of portions around a front wheel according to the embodiment.
Figure 3:
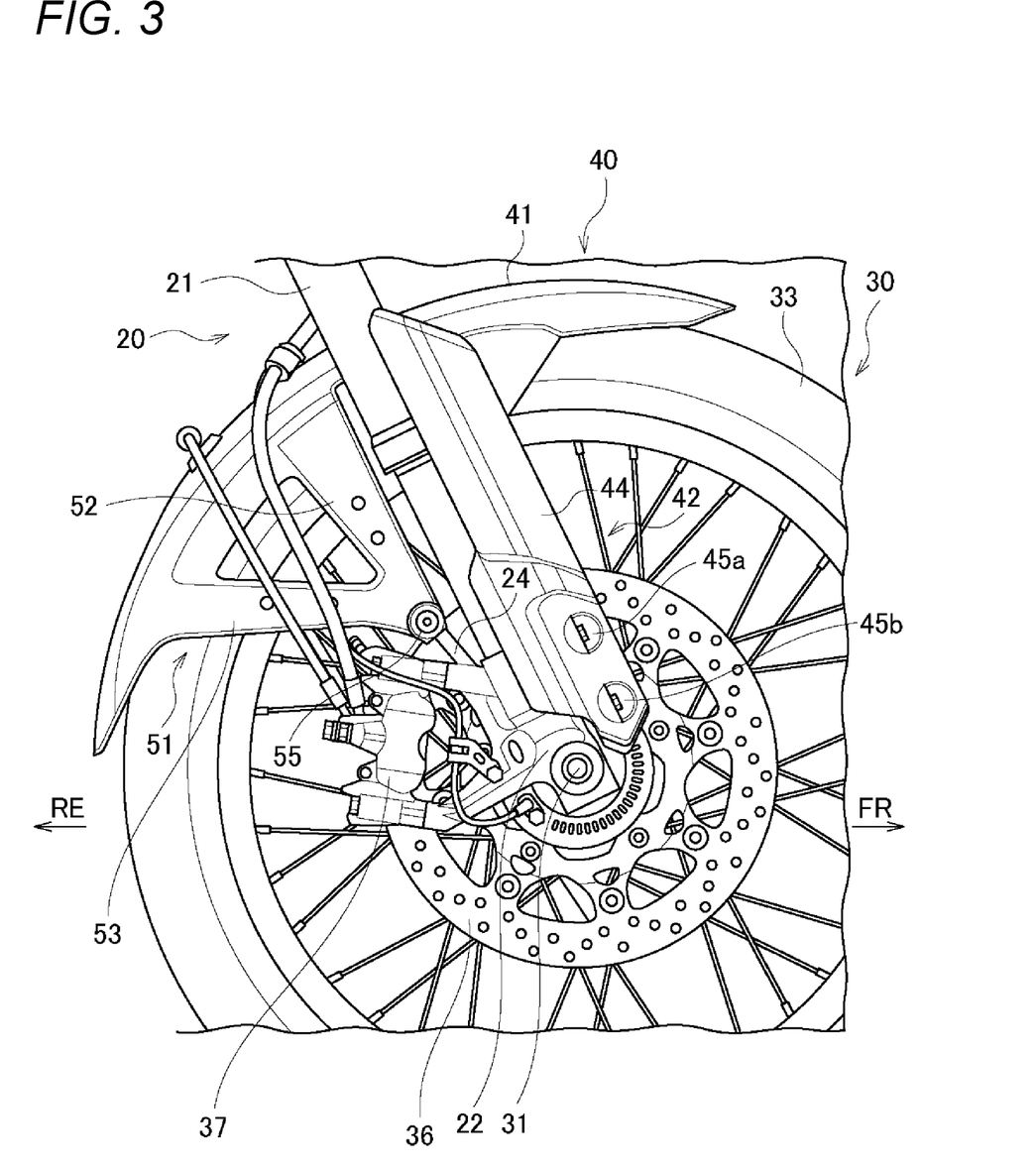
FIG. 3 is a right view of the portions around the front wheel according to the embodiment.
Figure 4:
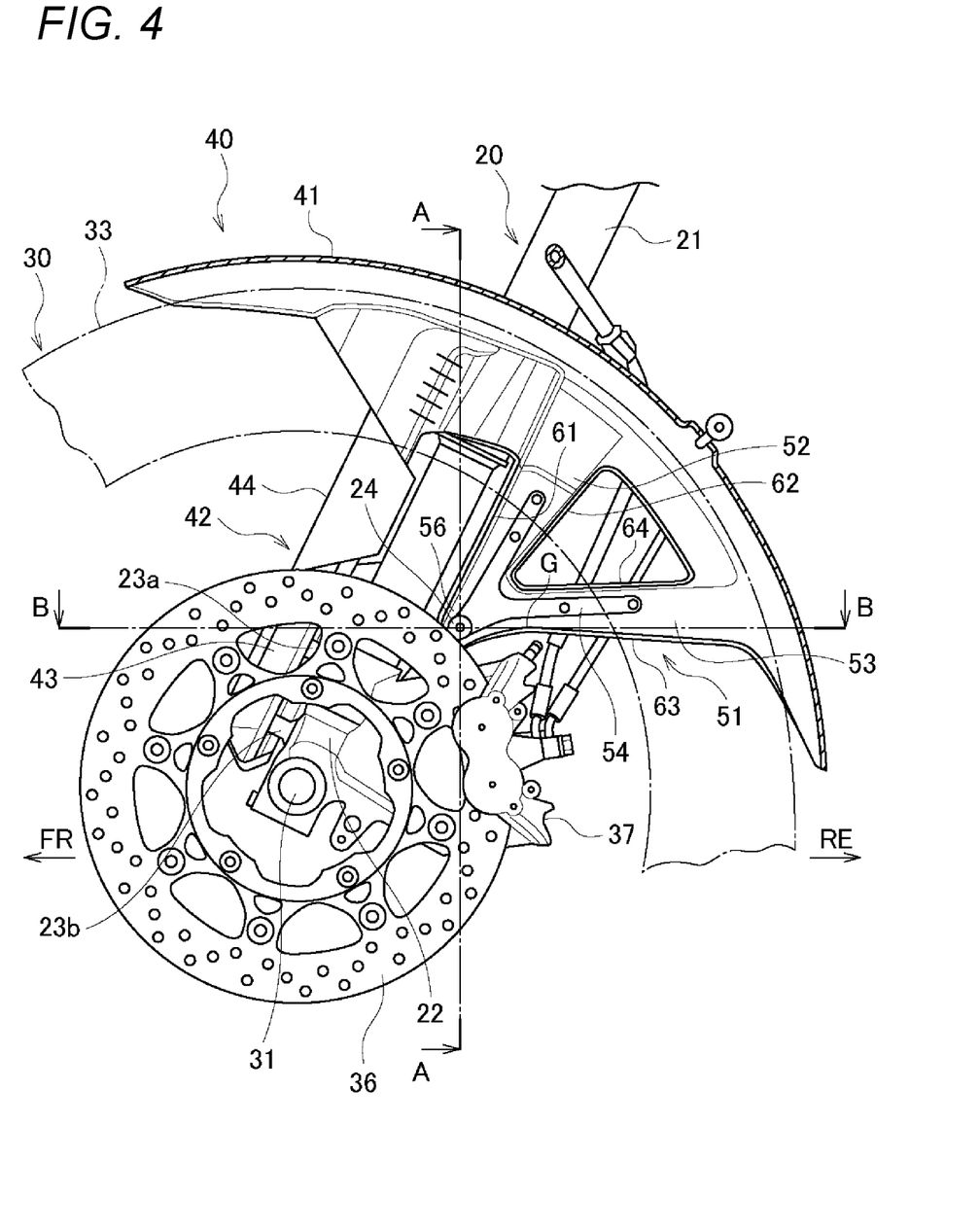
FIG. 4 is a side view of the portions around the front wheel according to the present embodiment as viewed from the inside.

Portions around the front wheel will be described with reference to FIGS. 2 to 4. FIG. 2 is a perspective view of the portions around the front wheel according to the embodiment. FIG. 3 is a right view of the portions around the front wheel according to the embodiment. FIG. 4 is a side view of the portions around the front wheel according to the present embodiment as viewed from the inside. In FIG. 4, the front wheel is omitted for convenience of illustration.

As shown in FIG. 2, an axle bracket 22 is provided on each of lower portions of a pair of fork tubes 21 of the front fork 20. The front wheel 30 is supported on the axle brackets 22 by an axle 31. The wheel of the front wheel 30 includes a tubular hub 32 into which the axle 31 is inserted, an annular rim 34 on which a tire 33 is mounted, and a plurality of spokes 35 coupling the hub 32 with the rim 34. A pair of annular plate-shaped brake discs 36 are fixed to two ends of the hub 32. The pair of brake calipers 37 that clamp the brake discs 36 are fixed to the axle brackets 22.

The front fender 40 made of resin is attached to the axle brackets 22 at the lower portion of the front fork 20. The front fender 40 is constituted by two types of molded components that are individually injection-molded. The molded component that is a base is obtained by integrally molding a fender body 41 that covers an upper side of the front wheel 30, a pair of fender bases 43 (see FIG. 4) disposed a front side relative to the pair of fork tubes 21, and the pair of fender support portions 51 disposed a rear side relative to the pair of fork tubes 21. The molded component that is an additional member is obtained by solely molding a pair of fender covers 44 that cover the pair of fender bases 43 from front.

As shown in FIGS. 3 and 4, the fender body 41 is disposed along an outer peripheral surface of the tire 33. The fender body 41 covers the outer peripheral surface of the tire 33 from above to constitute a mudguard surface. The pair of fender bases 43 extend from two front side edges of the fender body 41 toward the axle 31. The pair of fender covers 44 are attached to front surfaces of the pair of fender bases 43. The fender bases 43 and the fender covers 44 are disposed along the fork tubes 21. Each of the fender bases 43 has an L-shape by an inner wall and a rear wall. Each of the fender covers 44 is a curved plate covering the fender base 43 from front.

The fender base 43 and the fender cover 44 constitute a pillar shaped leg portion 42. The leg portion 42 has a hollow cross section by the L-shape of the fender base 43 and the curved shape of the fender cover 44, so that the weight of the leg portion 42 is reduced and the rigidity of the pair of leg portions 42 is increased. In particular, since the fender base 43 and the fender cover 44 are located front and rear, the rigidity of the leg portion 42 against bending in the front-rear direction is increased. In this case, similarly to a normal front fender, the fender base 43 extending downward from the fender body 41 can be made long using a mold for front and rear removal.

The pair of fender support portions 51 extend from two edges of a rear side of the fender body 41 toward the axle 31. Each of the fender support portions 51 is formed by coupling a first arm 52 disposed along the fork tube 21 with a second arm 53 extending substantially horizontally in a V shape. A reinforcing plate 54 having a V shape in a side view is attached to an inner surface of the fender support portion 51. The fender support portion 51 is reinforced from the inside by the reinforcing plate 54, so that the rigidity is increased. In this way, the rigidity of the leg portion 42 extending from a front side of the fender body 41 is increased, and the rigidity of the fender support portion 51 extending from the rear side of the fender body 41 is increased.

Parts of a lower portion of each of the fender covers 44 are caved in to reveal seat surfaces 45a, 45b. The axle bracket 22 is formed with attachment portions 23a, 23b corresponding to the seat surfaces 45a, 45b. The seat surfaces 45a. 45b are screwed to the attachment portions 23a. 23b through the fender base 43, so that the leg portion 42 is fixed to the axle bracket 22. A seat surface 55 is disposed at a top portion of the fender support portion 51. A stay 24 extends from the axle bracket 22 toward the top portion of the fender support portion 51. The seat surface 55 is screwed to a distal end portion of the stay 24, so that the fender support portion 51 is fixed to the axle bracket 22.

The front side of the fender body 41 is supported by the leg portions 42 attached to the axle brackets 22. The rear side of the fender body 41 is supported by the fender support portions 51 attached to the axle brackets 22. The fender body 41 is stably supported by the pair of leg portions 42 and the pair of fender support portions 51 having high rigidity, so that the fender body 41 is prevented from coming into contact with the tire 33 during traveling. Since the pair of leg portions 42 and the pair of fender support portions 51 are fixed to the axle brackets 22, the front fender 40 is moved integrally with the front wheel 30 in accordance with the movement of the front fork 20.

Figure 5:
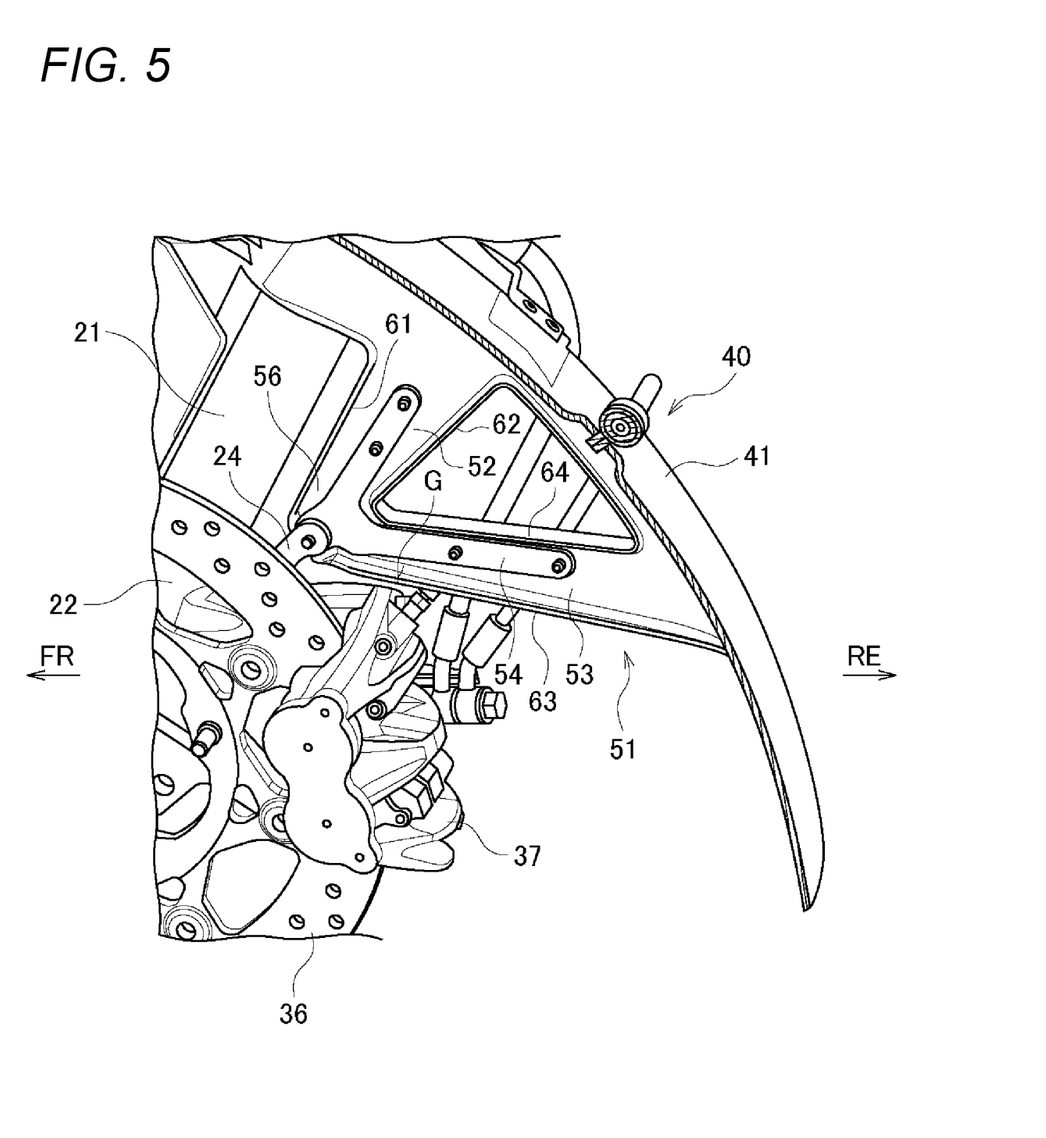
FIG. 5 is a perspective view of a fender support portion according to the present embodiment as viewed from the inside.
Figure 6:
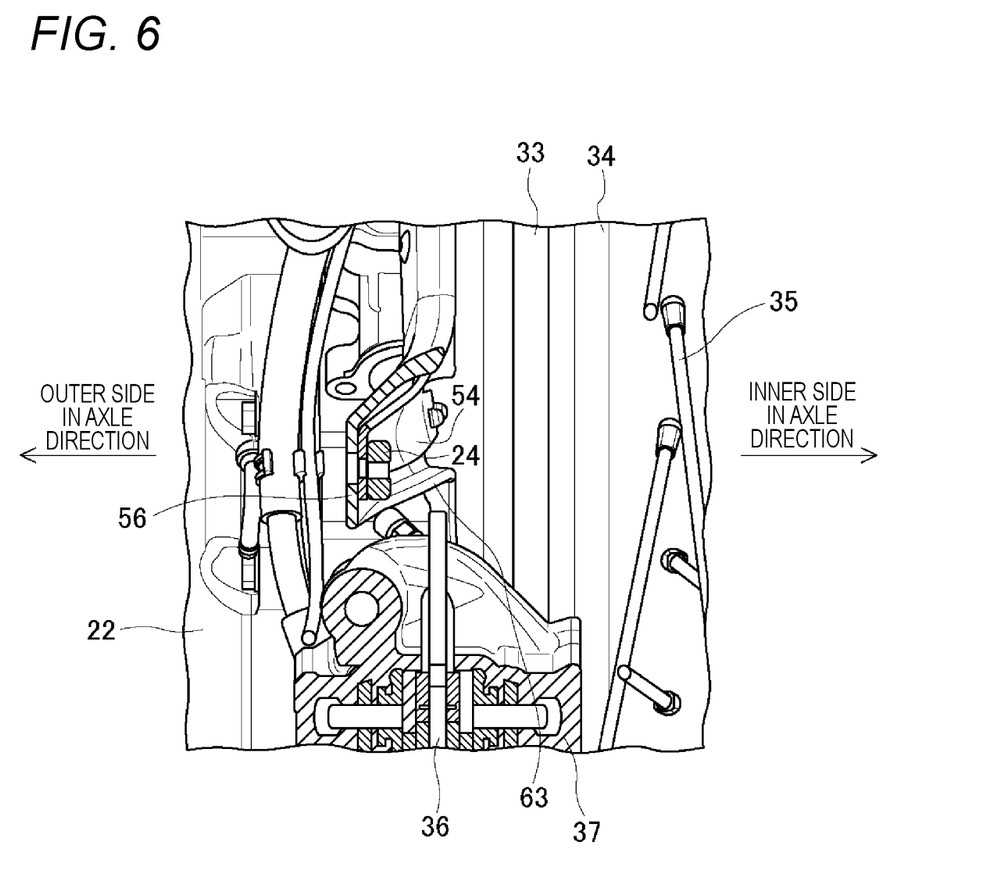
FIG. 6 is a sectional view of a front fender in FIG. 4 taken along a line A-A.
Figure 7:
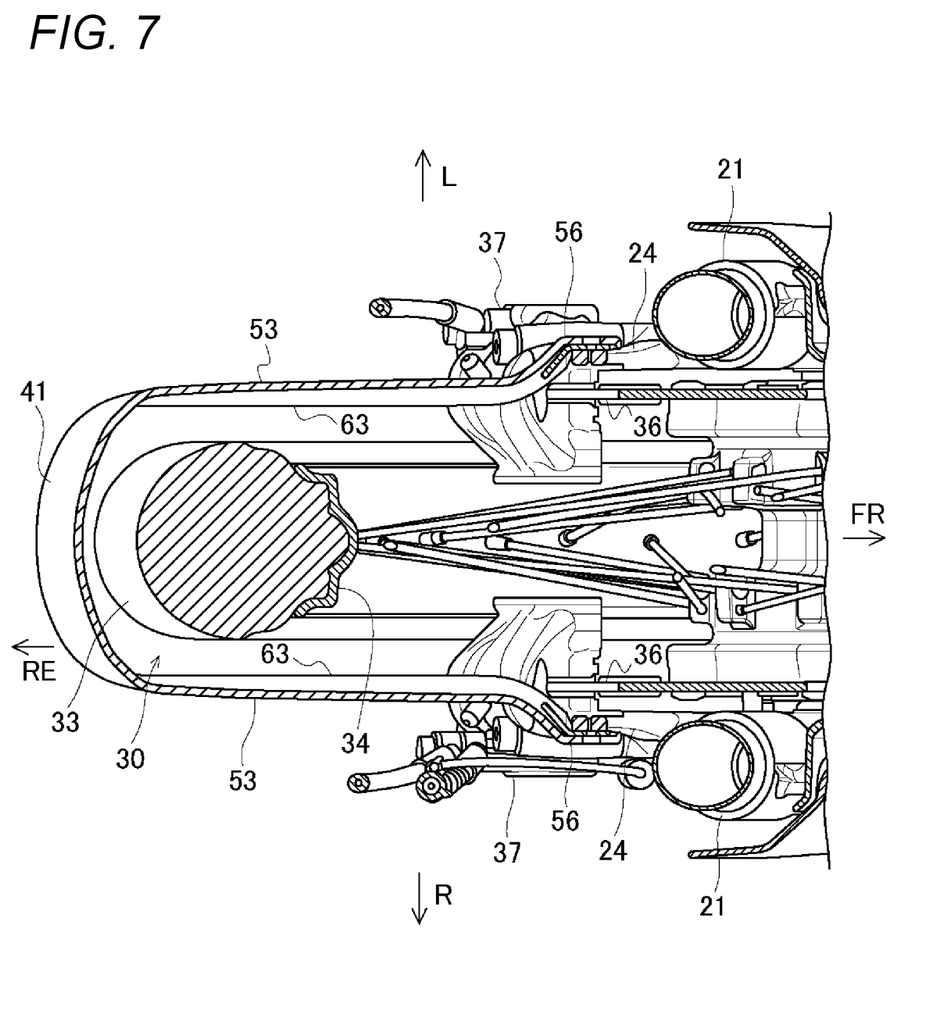
FIG. 7 is a sectional view of the front fender in FIG. 4 taken along line a B-B.

The fender support portion will be described in detail with reference to FIGS. 4 to 7. FIG. 5 is a perspective view of the fender support portion according to the present embodiment as viewed from the inside. FIG. 6 is a sectional view of the front fender in FIG. 4 taken along a line A-A. FIG. 7 is a sectional view of the front fender in FIG. 4 taken along line a B-B. In FIG. 4, the front wheel is omitted for convenience of illustration.

As shown in FIGS. 4 and 5, the axle bracket 22 is provided at the lower portion of the fork tube 21. The brake caliper 37 that brakes the front wheel 30 is fixed to a rear portion of the axle bracket 22, and the brake disc 36 that rotates integrally with the front wheel 30 is fixed to the front wheel 30. The brake caliper 37 is provided with the brake pad (not shown), so that the front wheel 30 is braked by frictional contact between the brake pad and the brake disc 36. The stay 24 extends from the axle bracket 22 along the fork tube 21. A coupling portion 56 at the top portion of the fender support portion 51 is attached to the distal end portion of the stay 24.

The fender support portion 51 is positioned rear a side relative to the fork tube 21. A front edge of the fender support portion 51, that is, a front edge of the first arm 52 extends vertically along the fork tube 21. The front edge of the first arm 52 includes a front edge folded portion (another folded portion) 61 formed such that the front edge of the first arm 52 is directed inward in the axle direction. When the muddy water is splashed up by the front wheel 30, the muddy water is less likely to flow toward the fork tube 21 from the front edge of the first arm 52 due to the front edge folded portion 61, thereby being prevented from adhering to the fork tube 21. A rear edge of the first arm 52 includes a rear edge folded portion 62 formed such that the rear edge of the first arm 52 is also directed inward in the axle direction.

The fender support portion 51 is positioned above the brake caliper 37. The lower edge of the fender support portion 51, that is, a lower edge of the second arm 53 extends in the front-rear direction above the brake caliper 37. The lower edge of the second arm 53 includes a lower edge folded portion (folded portion) 63 formed such that the lower edge of the second arm 53 is directed inward in the axle direction. When the muddy water is splashed up by the front wheel 30, the muddy water is less likely to flow down from the lower edge of the second arm 53 to the brake caliper 37 due to the lower edge folded portion 63, so that abnormal wear of the brake pad and adhesion of the muddy water to the brake caliper 37 are prevented. An upper edge of the second arm 53 includes an upper edge folded portion 64 formed such that the upper edge of the second arm 53 is also directed inward in the axle direction.

A predetermined position G directly above the brake caliper 37 is highest in the lower edge folded portion 63. A rear side of the lower edge folded portion 63 relative to the predetermined position G is inclined to be lowered rearward, so that the muddy water flowing to the lower edge of the second arm 53 flows to rear of the brake caliper 37 along the lower edge folded portion 63. A front side of the lower edge folded portion 63 relative to the predetermined position G is inclined to be lowered forward, so that the muddy water flowing to the lower edge of the second arm 53 flows to front of the brake caliper 37 along the lower edge folded portion 63. In this way, the muddy water is controlled by the lower edge folded portion 63 to avoid flowing directly above the brake caliper 37.

The coupling portion 56 is located a front side relative to the predetermined position G of the lower edge folded portion 63. Since the coupling portion 56 is coupled to the stay 24 of the axle bracket 22 by a bolt (not shown), the muddy water is likely to accumulate in a gap between components such as the bolt and the reinforcing plate 54. Since the part from the coupling portion 56 to the predetermined position G of the lower edge folded portion 63 is an uphill, the muddy water adhering to peripheral components of the coupling portion 56 is less likely to flow along the lower edge folded portion 63 toward the brake caliper 37. For this reason, the muddy water in the vicinity of the coupling portion 56 is prevented from flowing down from the vicinity of the predetermined position G of the lower edge folded portion 63 that is directly above the brake caliper 37.

As shown in FIG. 6, a lower edge of the coupling portion 56 faces downward, without constituting the lower edge folded portion 63. The muddy water adhering to the peripheral components of the coupling portion 56 is discharged from the lower edge of the coupling portion 56, and is less likely to flow toward the brake caliper 37 along the lower edge folded portion 63. The muddy water is discharged from the lower edge of the coupling portion 56 along the front edge folded portion 61. Since the stay 24 is coupled to the coupling portion 56, the muddy water easily flows from the coupling portion 56 to the axle bracket 22 along the stay 24. For this reason, the muddy water is less likely to flow down from the coupling portion 56 to the brake caliper 37.

As shown in FIG. 7, the coupling portion 56 is located outward of the second arm 53 in the axle direction. A front end portion of the second arm 53 is curved outward in the axle direction toward the front, and a rear side of the second arm 53 relative to the front end portion is inclined inward in the axle direction toward the rear. The lower edge folded portion 63 is disposed over the entire length of the second arm 53, and is bent further inward in the axle direction than the brake disc 36 on the rear side of the second arm 53 relative to the front end portion. Although the lower edge folded portion 63 is not disposed below the coupling portion 56, the coupling portion 56 is sufficiently separated from the brake disc 36 to an outer side in the axle direction.

With such a configuration, even when a part of the muddy water flows down from the lower edge folded portion 63, the muddy water adheres to the inner side in the axle direction than a sliding surface between the brake caliper 37 and the brake disc 36. At the coupling portion 56, the muddy water flows down to a position separated from the sliding surface between the brake caliper 37 and the brake disc 36 to the inner side in the axle direction, and a part of the muddy water flows to the axle bracket 22 along the stay 24. The muddy water is less likely to enter the sliding surface between the brake pad of the brake caliper 37 and the brake disc 36, so that abnormal wear of the brake pad is prevented, and the frequency of replacement of the brake pad can be reduced.

A front end of the lower edge folded portion 63 is located a front side relative to a front portion of the brake caliper 37. A rear end of the lower edge folded portion 63 is located a rear side relative to a rear portion of the brake caliper 37. Therefore, a part of the lower edge folded portion 63 overlaps the brake caliper 37 in a top view. Further, the rear end of the lower edge folded portion 63 extends further rearward relative to the rim 34 of the front wheel 30. The lower edge folded portion 63 overlaps the tire 33 of the front wheel 30 in a side view. The width of the lower edge folded portion 63 decreases toward the rear, so that the muddy water flowing along the lower edge folded portion 63 easily flows down in the vicinity of the front wheel 30.

Figure 8:
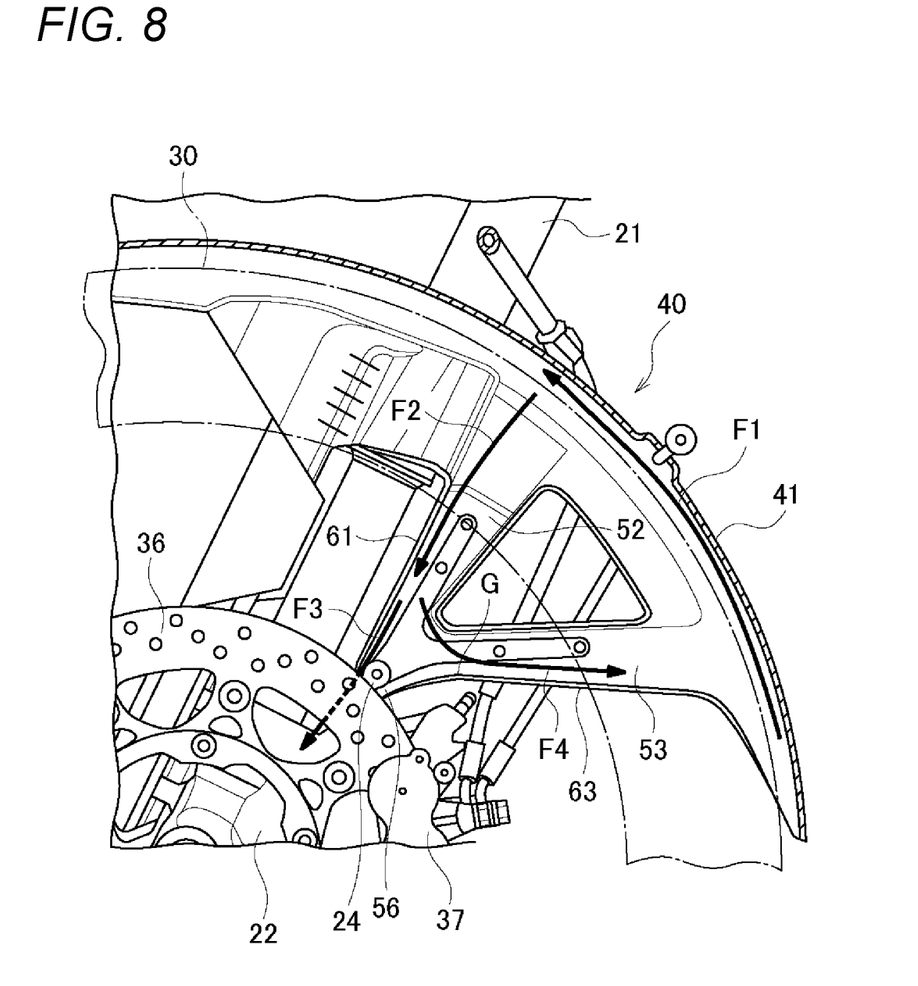
FIG. 8 is a schematic view of a flow of muddy water on the front fender according to the present embodiment.

A flow of the muddy water on the front fender will be described with reference to FIG. 8. FIG. 8 is a schematic view of the flow of the muddy water on the front fender according to the present embodiment.

As shown in FIG. 8, when the muddy water is splashed up by the front wheel 30, the muddy water adheres to the inner surface of the fender body 41, thereby being prevented from scattering to lighting equipment and the rider. As shown by an arrow F1, the muddy water moves upward along the inner surface of the fender body 41 by the momentum of the muddy water splashed up by the front wheel 30. As shown by an arrow F2, the muddy water moves from the inner surface of the fender body 41 to an inner surface of the first arm 52, and moves downward along the inner surface of the first arm 52. At this time, the muddy water is less likely to flow forward due to the front edge folded portion 61, thereby being prevented from adhering to the fork tube 21.

The flow of the muddy water is branched into two parts above the coupling portion 56. As indicated by an arrow F3, a part of the muddy water is discharged from the lower edge of the coupling portion 56 toward the axle bracket 22. Since the muddy water moves along the stay 24 from the lower edge of the coupling portion 56, the muddy water is prevented from adhering to the brake caliper 37. Even when the muddy water flows down from the lower edge of the coupling portion 56, the muddy water is prevented from entering the sliding surface of the disc brake 36 since the coupling portion 56 is separated from the brake disc 36 (see FIG. 7) to the outer side in the axle direction. Since the lower edge of the coupling portion 56 is not folded, the flow of the muddy water is not blocked by the lower edge of the coupling portion 56.

As shown by an arrow F4, the remaining muddy water moves rearward along an inner surface of the second arm 53. The muddy water is less likely to flow down from the lower edge folded portion 63 above the brake caliper 37, thereby being prevented from adhering to the brake caliper 37. Even when the muddy water flows down from the lower edge folded portion 63, the muddy water is prevented from entering the sliding surface of the disc brake since the lower edge folded portion 63 protrudes further inward in the axle direction than the brake disc 36. Since the rear side of the lower edge folded portion 63 relative to the predetermined position G is a downhill, the muddy water moves rearward along the lower edge turning back portion 63 and flows down in the vicinity of the front wheel 30.

According to the present embodiment described above, the muddy water splashed up by the front wheel 30 hits the inner surface of the front fender 40, thereby being prevented from scattering. Although the muddy water hitting the front fender 40 moves downward along the inner surface of the fender support portion 51, the muddy water is prevented from flowing down from the lower edge of the fender support portion 51 to the brake caliper 37 due to the lower edge folded portion 63. Therefore, abnormal wear of the brake pad of the brake caliper 37 can be prevented, and deterioration of the appearance of the brake caliper 37 due to dirt can be prevented.

In the present embodiment, scattering of the muddy water and falling of the muddy water to the brake caliper are prevented by the front fender. Scattering of the rain water and falling of the rain water to the brake caliper are also prevented by the front fender.

In the present embodiment, the fender support portion is formed by coupling the first arm and the second arm in a V shape. Alternatively, the shape of the fender support portion is not particularly limited. The fender support portion may extend from two side edges of the fender body toward the axle, and the lower edge of the fender support portion may include a folded portion formed such that the lower edge of the fender support portion is directed inward in the axle direction.

In the present embodiment, the front fender is attached to the axle bracket. Alternatively, the front fender may be attached to the front fork. For example, the front fender may be attached to a bridge or the like of the front fork.

In the present embodiment, the fender support portion attached to the axle bracket is described as the fender side surface. Alternatively, the fender side surface may extend from two side edges of the fender body to the axle, and may not be attached to the axle bracket.

In the present embodiment, the lower edge folded portion is bent inward in the axle direction relative to the brake disc. Alternatively, the lower edge folded portion may protrude inward in the axle direction from the inner surface of the fender side surface.

The front fender is not limited to the straddle-type vehicle shown in the drawings, and may also be applied to other types of straddle-type vehicles. The straddle-type vehicle is not limited to general vehicles on which a rider rides in a posture of straddling a seat, and also includes a small-sized scooter-type vehicle on which a rider rides without straddling a seat.

As described above, a front fender (40) according to the present embodiment is attached to a front fork (20) of a straddle-type vehicle (1). The front fender includes: a fender body (41) covering an upper side of a front wheel (30) supported by the front fork; and a pair of fender side surfaces (fender support portions 51) extending from two side edges of the fender body to an axle (31). The front fork is provided with brake caliper (37) that brakes the front wheel. A lower edge of each of the fender side surfaces extends in a front-rear direction above the brake caliper, and includes a folded portion (lower edge folded portion 63) formed such that the lower edge of each of the fender side surfaces is directed inward in an axle direction. According to this configuration, muddy water splashed up by the front wheel hits an inner surface of the front fender, thereby being prevented from scattering. Although the muddy water and the rain water hitting the front fender move downward along inner surfaces of fender side surfaces, the folded portions prevent the muddy water and the rain water from flowing down from the lower edges of the fender side surfaces to the brake calipers. Therefore, brake pads of the brake calipers can be prevented from abnormal wear, and the appearance of the brake calipers can be prevented from deteriorating due to dirt.

In the front fender according to the present embodiment, the front wheel is provided with brake discs (36) held by the brake calipers, and the folded portion is bent such that a part of the folded portion is located inner side in the axle direction relative to the brake disc. According to this configuration, muddy water and rain water are less likely to flow down to the sliding surface between the brake caliper and the brake disc, and abnormal wear of the brake pad of the brake caliper can be prevented.

In the front fender according to the present embodiment, a rear side of the folded portion relative to a predetermined position (G) directly above the brake caliper is inclined to be lowered rearward. According to this configuration, the muddy water and the rain water flowing to the lower edge of the fender side surface can flow to rear of the brake caliper by the folded portion.

In the front fender according to the present embodiment, a front side of the folded portion relative to a predetermined position (G) directly above the brake caliper is inclined to be lowered forward. According to this configuration, the muddy water and the rain water flowing to the lower edge of the fender side surface can flow to front of the brake caliper by the folded portion.

In the front fender according to the present embodiment, a coupling portion (56) attached to the front fork is disposed on each of the fender side surfaces, and the coupling portion is located a front side relative to the predetermined position of the folded portion. According to this configuration, the muddy water and the rain water adhering to peripheral components of the coupling portion are less likely to flow toward the brake caliper along the folded portion.

In the front fender according to the present embodiment, a lower edge of the coupling portion is directed downward.

According to this configuration, the muddy water and the rain water adhering to the peripheral components of the coupling portion are discharged from the lower edge of the coupling portion, and are thus less likely to flow toward the brake caliper along the folded portion.

In the front fender according to the present embodiment, a front edge of each of the fender side surfaces extends vertically along the front fork, and includes another folded portion (front edge folded portion 61) formed such that a front edge of each of the fender side surfaces is directed inward in the axle direction. According to this configuration, the muddy water and the rain water are prevented from flowing toward the front fork from the front edge of the fender side surface due to the folded portion. Therefore, the appearance of the front fork due to dirt can be prevented from deteriorating.

Although the present embodiment has been described, a part or all of the above-described embodiment and modifications may be combined as another embodiment.

The technique of the present disclosure is not limited to the above-described embodiment, and various changes, substitutions, and modifications may be made without departing from the spirit of the technical idea of the present disclosure. The present invention may be implemented by other methods as long as the technical idea can be implemented by the methods through advance of the technique or other derivative techniques. Therefore, the scope of the claims covers all embodiments that may be included within the scope of the technical idea.

What is claimed is:

1. A front fender attached to a front fork of a straddle-type vehicle, the front fender comprising:
   a fender body covering an upper side of a front wheel supported by the front fork; and
   a pair of fender side surfaces extending from two side edges of the fender body to an axle,
   wherein the front fork is provided with brake caliper that brakes the front wheel,
   wherein a lower edge of each of the fender side surfaces extends in a front-rear direction above the brake caliper, and includes a folded portion formed such that the lower edge of each of the fender side surfaces is directed inward in an axle direction,
   a pair of fender support portions extend from two edges of a rear side of the fender body toward the axle,
   each of the fender support portions includes an arm extending forward and substantially horizontally toward the axle,
   at a rear side of a fork tube of the front fork, the arm is positioned above the brake caliper and the lower edge of the arm extends substantially horizontally above the brake caliper, and
   a lower edge of the arm includes the folded portion formed such that the lower edge of the arm is directed inward in a direction in the axle direction.

2. The front fender according to claim 1,
   wherein the front wheel is provided with brake disc held by the brake caliper, and wherein the folded portion is bent such that a part of the folded portion is located an inner side in the axle direction relative to the brake disc.

3. The front fender according to claim 1,
   wherein a rear side of the folded portion relative to a predetermined position directly above the brake caliper is inclined to be lowered rearward.

4. The front fender according to claim 1,
   wherein a front side of the folded portion relative to a predetermined position directly above the brake caliper is inclined to be lowered forward.

5. The front fender according to claim 4,
   wherein a coupling portion attached to the front fork is disposed on each of the fender side surfaces, and
   wherein the coupling portion is located a front side of the predetermined position of the folded portion.

6. The front fender according to claim 5,
   wherein a lower edge of the coupling portion is directed downward.

7. The front fender according to claim 1,
   wherein a front edge of each of the fender side surfaces extends vertically along the front fork, and includes another bent portion formed such that the front edge of each of the fender side surfaces is directed inward in the axle direction.

8. A front fender attached to a front fork of a straddle-type vehicle, the front fender comprising:
   a fender body covering an upper side of a front wheel supported by the front fork; and
   a pair of fender side surfaces extending from two side edges of the fender body to an axle,
   wherein the front fork is provided with brake caliper that brakes the front wheel,
   wherein a lower edge of each of the fender side surfaces extends in a front-rear direction above the brake caliper, and includes a folded portion formed such that the lower edge of each of the fender side surfaces is directed inward in an axle direction,
   wherein the front wheel is provided with brake disc held by the brake caliper, and wherein the folded portion is bent such that a part of the folded portion is located an inner side in the axle direction relative to the brake disc.

9. A front fender attached to a front fork of a straddle-type vehicle, the front fender comprising:
   a fender body covering an upper side of a front wheel supported by the front fork; and
   a pair of fender side surfaces extending from two side edges of the fender body to an axle,
   wherein the front fork is provided with brake caliper that brakes the front wheel,
   wherein a lower edge of each of the fender side surfaces extends in a front-rear direction above the brake caliper, and includes a folded portion formed such that the lower edge of each of the fender side surfaces is directed inward in an axle direction,
   wherein a front side of the folded portion relative to a predetermined position directly above the brake caliper is inclined to be lowered forward,
   wherein a coupling portion attached to the front fork is disposed on each of the fender side surfaces, and
   wherein the coupling portion is located a front side of the predetermined position of the folded portion.

10. A front fender attached to a front fork of a straddle-type vehicle, the front fender comprising:
    a fender body covering an upper side of a front wheel supported by the front fork; and
    a pair of fender side surfaces extending from two side edges of the fender body to an axle,
    wherein the front fork is provided with brake caliper that brakes the front wheel,
    wherein a lower edge of each of the fender side surfaces extends in a front-rear direction above the brake caliper, and includes a folded portion formed such that the lower edge of each of the fender side surfaces is directed inward in an axle direction, wherein a front edge of each of the fender side surfaces extends vertically along the front fork, and includes another bent portion formed such that the front edge of each of the fender side surfaces is directed inward in the axle direction.

* * * * *